United States Patent
Nakayama et al.

(10) Patent No.: US 8,492,650 B2
(45) Date of Patent: Jul. 23, 2013

(54) PARTITIONED ELECTRICAL JUNCTION BOX

(75) Inventors: Makoto Nakayama, Shizuoka (JP); Tatsuya Tsubouchi, Shizuoka (JP); Hiroshi Sakurai, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 251 days.

(21) Appl. No.: 12/801,721

(22) Filed: Jun. 22, 2010

(65) Prior Publication Data

US 2010/0319951 A1  Dec. 23, 2010

(30) Foreign Application Priority Data

Jun. 23, 2009 (JP) ................................. 2009-148172

(51) Int. Cl.
*H05K 5/00* (2006.01)

(52) U.S. Cl.
USPC ............. 174/50; 439/535; 248/906; 220/4.02

(58) Field of Classification Search
USPC ............. 174/50; 439/535; 248/906; 220/4.02
See application file for complete search history.

(56) References Cited

U.S. PATENT DOCUMENTS

| | | | |
|---|---|---|---|
| 5,378,854 A | 1/1995 | Hoover | |
| 7,520,389 B2 * | 4/2009 | Lalouette | 206/722 |
| 7,964,794 B2 * | 6/2011 | Chung | 174/58 |

FOREIGN PATENT DOCUMENTS

| | | |
|---|---|---|
| CN | 201113332Y Y | 9/2008 |
| JP | 6-48148 | 6/1994 |
| JP | 06-165345 A | 6/1994 |
| JP | 2001-204121 A | 7/2001 |

OTHER PUBLICATIONS

Office Action dated Sep. 19, 2012 in connection with related Chinese Application No. 201010217404.8, with English Translation.

* cited by examiner

*Primary Examiner* — Dhirubhai R Patel
(74) *Attorney, Agent, or Firm* — Edwards Wildman Palmer LLP; James E. Armstrong, IV; Stephen D. LeBarron

(57) ABSTRACT

A partitioned electrical junction box includes at least three partitioned junction box main bodies slidingly joined together to form a main cover, a lower cover and upper cover fitted into the main cover. The lower cover is fitted into a recess groove of the main cover, and the upper cover is fitted into an outside of the main cover. The three partitioned junction box main bodies respectively receive different functional components. First fitting parts are adjacently provided on any two of the partitioned junction box main bodies, and a first bracket is slidingly fitted into the first fitting parts simultaneously to join the two partitioned junction box main bodies.

9 Claims, 11 Drawing Sheets

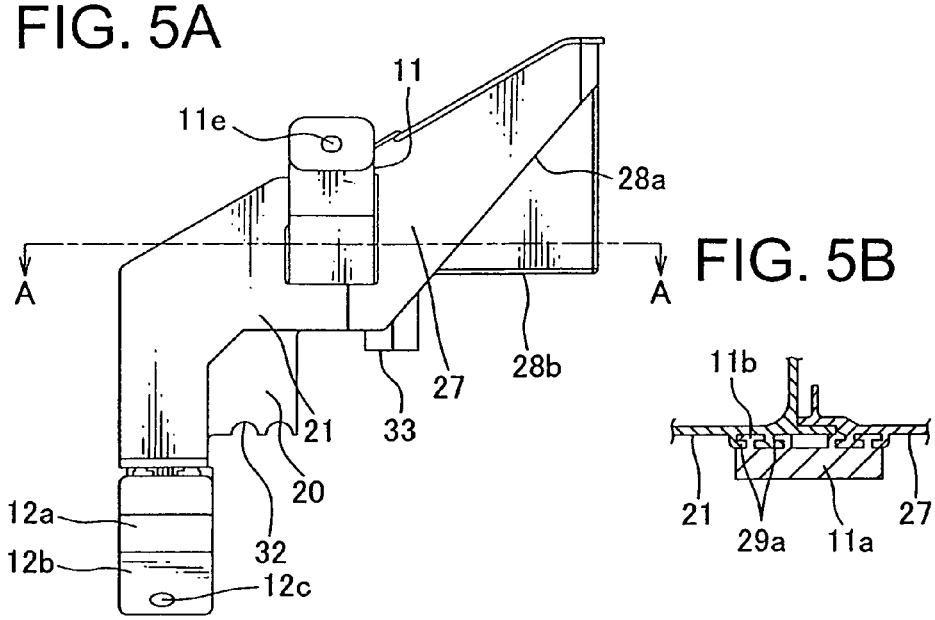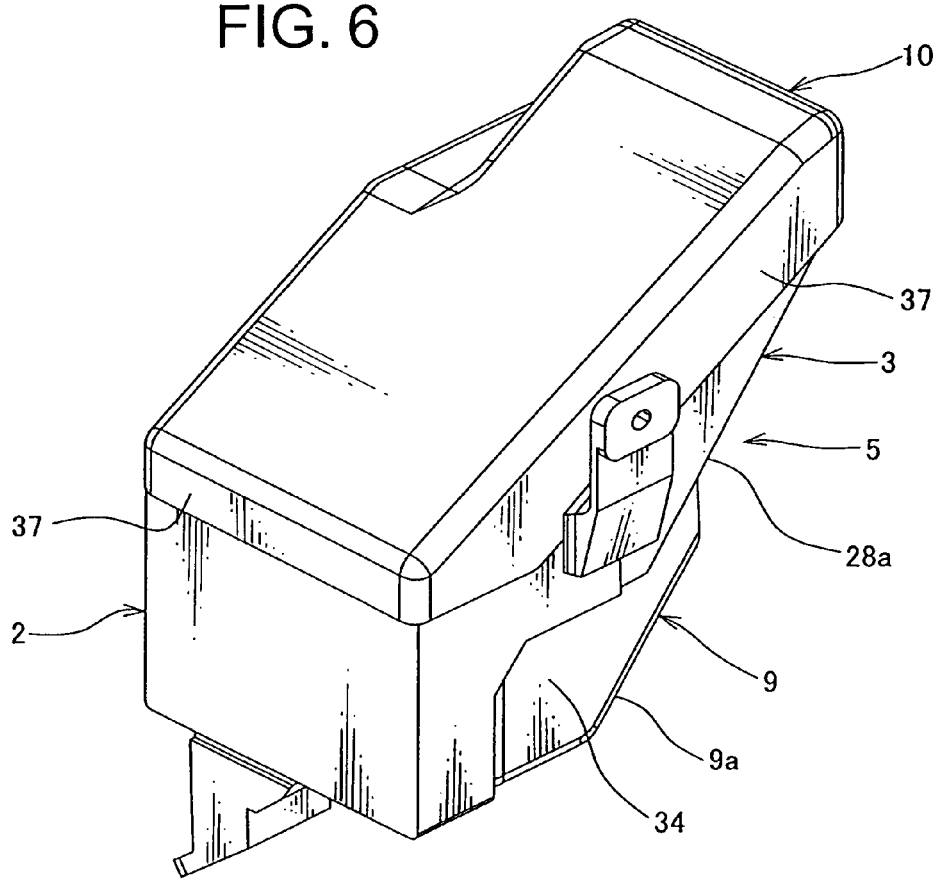

PARTITIONED ELECTRICAL JUNCTION BOX

CROSS REFERENCE TO RELATED APPLICATIONS

This application is on the basis of Japanese Patent Application No. 2009-148172, the contents of which are hereby incorporated by reference.

BACKGROUND OF THE INVENTION

1. Field of the Invention

The present invention relates to a partitioned electrical junction box in which a middle main cover other than upper and lower covers is partitioned into a plurality of bodies.

2. Description of the Related Art

FIG. 12 shows an embodiment of a conventional partitioned electrical junction box (see Patent Document 1).

This partitioned electrical junction box 81 includes a first partitioned junction box main body 82 and a second partitioned junction box main body 83. The first partitioned junction box main body 82 includes a pair of first vertical rectangular tubes 84. The second partitioned junction box main body 83 includes a pair of second vertical rectangular tubes 85 of which inner radiuses are smaller than those of the first rectangular tubes 84. The first and second partitioned junction box main bodies 82, 83 are fixed together by the second rectangular tubes 85 slidingly fitted into the first rectangular tubes 84 and by clipping the first and second rectangular tubes 84, 85 in a fitting direction with a metallic spring clip 86. The first and second partitioned junction box main bodies 82, 83 are fixed to a vehicle body with screws by substantially horizontal brackets 87.

Patent Document 2 as another example of the partitioned electrical junction box (not shown) discloses that two partitioned junction box main bodies are slidingly joined together with vertical concave convex fitting members and locking members. Further, horizontal brackets of the two partitioned junction box main bodies are joined together with a bolt. Patent Document 3 discloses that two partitioned junction box main bodies are joined together with a horizontal guide rail and a sliding member, and dual partitioned upper covers respectively covering the partitioned junction box main bodies are engaged with each other.

[Patent Document 1] JP, A, No. 2001-204121 (FIG. 1)
[Patent Document 2] JP, A, No. H06-165345 (FIG. 1)
[Patent Document 3] JP, U, No. H06-48148 (FIG. 1)

However, in the conventional partitioned electrical junction box 81, the joined part is limited to the joined part between two partitioned junction box main bodies 82, 83. Therefore, for example, if the partitioned junction box main bodies are three, there is a fear that binding force between the partitioned junction box main bodies may be decreased, and each partitioned junction box main body may be shaky.

Further, because electric components such as fuse, relay, connector or the like are arranged in two partitioned junction box main bodies 82, 83, two partitioned junction box main bodies 82, 83 are changed at the same time corresponding to grades of a vehicle or a newly derivative vehicle. Therefore, man-hour for designing the partitioned junction box main bodies 82, 83 and the cost thereof are increased. Further, there is a fear that the partitioned electrical junction box 81 may become larger when these partitioned junction box main bodies 82, 83 are joined together.

When the partitioned junction box main bodies 82, 83 are fixed to a vehicle body or the like with the brackets 87 in a state that the partitioned junction box main bodies 82, 83 are joined together, because the brackets 87 are integrally formed with the partitioned junction box main bodies 82, 83, and projected widely in a horizontal direction, there is a fear that layout flexibility of the brackets 87 may be limited, and portability of the partitioned electrical junction box 81 may be reduced owing that the partitioned electrical junction box 81 becomes larger. Further, when the brackets 87 are separated from the partitioned junction box main bodies 82, 83 for increasing the layout flexibility of the brackets 87, there is a fear that fitting strength of the brackets 87 to the partitioned junction box main bodies 82, 83 may be reduced.

Accordingly, an object of the present invention is to provide a partitioned electrical junction box configured to allow three partitioned junction box main bodies to be joined together firmly without wavering, configured to allow the partitioned junction box main bodies for a derivative car to be designed and produced easily at low cost, configured to prevent the partitioned junction box main bodies from becoming larger, configured to increase the layout flexibility of the fixing brackets for a vehicle body or the like (structure to be mounted) and to increase fixing strength of the brackets to partitioned junction box main bodies or lower covers, and configured to prevent the partitioned electrical junction box from becoming larger due to the brackets or the like.

SUMMARY OF THE INVENTION

In order to attain the object, according to the present invention, there is provided a partitioned electrical junction box including:

at least three partitioned junction box main bodies of which joining parts are slidingly joined together to form a main cover;

a lower cover and an upper cover respectively configured to be fitted into the main cover.

According to the above, when the three partitioned junction box main bodies are fitted with the lower cover and the upper cover in a state that three partitioned junction box main bodies are joined together, the lower and upper covers tighten the three partitioned junction box main bodies in XY directions to be joined together to fix the three partitioned junction box main bodies firmly without wavering. Further, if any one of the three partitioned junction box main bodies is insufficiently joined, the lower and upper covers cannot be fitted to notify of the insufficient join. Further, when the three partitioned junction box main bodies are jointed together with joined parts (the first partitioned junction box main body is joined with the second partitioned junction box main body, the second partitioned junction box main body is joined with the third partitioned junction box main body, and the third partitioned junction box main body is joined with the first partitioned junction box main body), the three partitioned junction box main bodies are joined together firmly and stably.

Preferably, the lower cover is fitted into a recess groove of the main cover, and the upper cover is fitted into an outside of the main cover.

According to the above, while the partitioned junction box main bodies are joined together, the main cover is pressed outward by the lower cover, and pressed inward by the upper cover, thereby the lower and upper cover sandwich the partitioned junction box main bodies to fix them firmly without wavering. The recess groove includes an outside inner wall and an inside inner wall facing each other. The lower cover contacts the outside inner wall of the recess groove.

Preferably, different functional components are received respectively in the three partitioned junction box main bodies.

According to the above, when only a part of functional components is changed corresponding to a newly derivative vehicle, only a part of partitioned junction box main bodies receiving the functional component is changed, and the other partitioned junction box main bodies are not changed.

Preferably, first fitting parts are adjacently provided on any two of the partitioned junction box main bodies, and a first bracket is slidingly fitted into the first fitting part so as to join the two partitioned junction box main bodies.

According to the above, because fitting parts of the brackets are fitted into the fitting parts of the two partitioned junction box main bodies to join the partitioned junction box main bodies together, the two partitioned junction box main bodies are joined by the joining parts and the fitting parts, thereby joining strength of the two partitioned junction box main bodies is increased. The bracket works as fixing the main cover to an outside and as reinforcing the joining.

Preferably, a second fitting part is provided on a bottom wall of any one of the partitioned junction box main bodies, and a second bracket is slidingly fitted into the second fitting part so as to seal a die hole for forming the second fitting part on the bottom wall.

According to the above, because the second fitting part is provided not on a side wall but on the bottom wall of the partitioned junction box main body, an outer periphery of the main cover becomes compact. Further, because the die hole generated by conforming a mold removal direction of the second fitting part to a mold removal direction of the side wall and the bottom wall of the partitioned junction box main bodies is sealed by the second bracket, the partitioned junction box main bodies simply become watertight.

Preferably, an inclined surface is provided on a rail as the second fitting part, and water in any of the partitioned junction box main bodies is discharged along the inclined surface. Thereby, the functional components received in the partitioned junction box main bodies are protected from rust or short-circuit.

According to the above, a drop of water generated in the partitioned junction box main bodies due to dew condensation or the like is discharged outside along the inclined surface of the rail (through a gap between the inclined surface and the fitting part of the bracket).

Preferably, a third fitting part is provided on a side wall of the lower cover or the main cover. Further, simultaneously, a fitting part at one side of a third bracket is slidingly fitted to one side of the third fitting part, and a convex or a concave at the other side of the third bracket is slidingly engaged with a concave or a convex at the other side of the third fitting part.

According to the above, for example, in a case that the third bracket is long, when the fitting part at one side in a longitudinal direction is slidingly fitted into the fitting part of the partitioned junction box main bodies, and, for example, a convex at the other side in the longitudinal direction of the bracket is slidingly engaged with a concave of the fitting part of the partitioned junction box main bodies, an outward opening deformation around the fitting part at the one side of the bracket is prevented, and fixing strength between the bracket and the partitioned junction box main bodies is increased.

Preferably, a connector holding part is provided on a dead space between a bottom side of anyone of the partitioned junction box main bodies and the lower cover, and a joint connector is temporarily fixed to the connector holding part.

According to the above, in an assembling process of the electrical junction box, for example, when the functional components in the partitioned junction box main bodies are jointed, it becomes unnecessary to fix a wired connector with a conventional tape by temporarily fixing the wired connector to the connector holding part, and a required connector can be easily selected.

Preferably, the joining part of any one of the partitioned junction box main bodies is slidingly joined together from above with the joining parts of the other two partitioned junction box main bodies, and the one of the partitioned junction box main bodies is fixed from above to a mounting-side structure with a screw.

According to the above, while any one of the partitioned junction box main bodies pushes downward the other two partitioned junction box main bodies to the mounting-side structure of such as a vehicle body, the one of the partitioned junction box main bodies is fixed downward with a screw so that each of the partitioned junction box main bodies is firmly fixed to the mounting-side structure without any vertical shake.

These and other objects, features, and advantages of the present invention will become more apparent upon reading of the following detailed description along with the accompanied drawings.

BRIEF DESCRIPTION OF THE DRAWINGS

FIG. 5A is a side view showing the main cover having a bracket;

FIG. 5B is a sectional view taken on line A-A of FIG. 5A;

FIG. 6 is a perspective view showing a whole partitioned electrical junction box of which main cover is assembled;

DETAILED DESCRIPTION OF THE PREFERRED EMBODIMENTS

FIGS. 1 to 9 show an embodiment of a partitioned electrical junction box according to the present invention.

Figure 1:
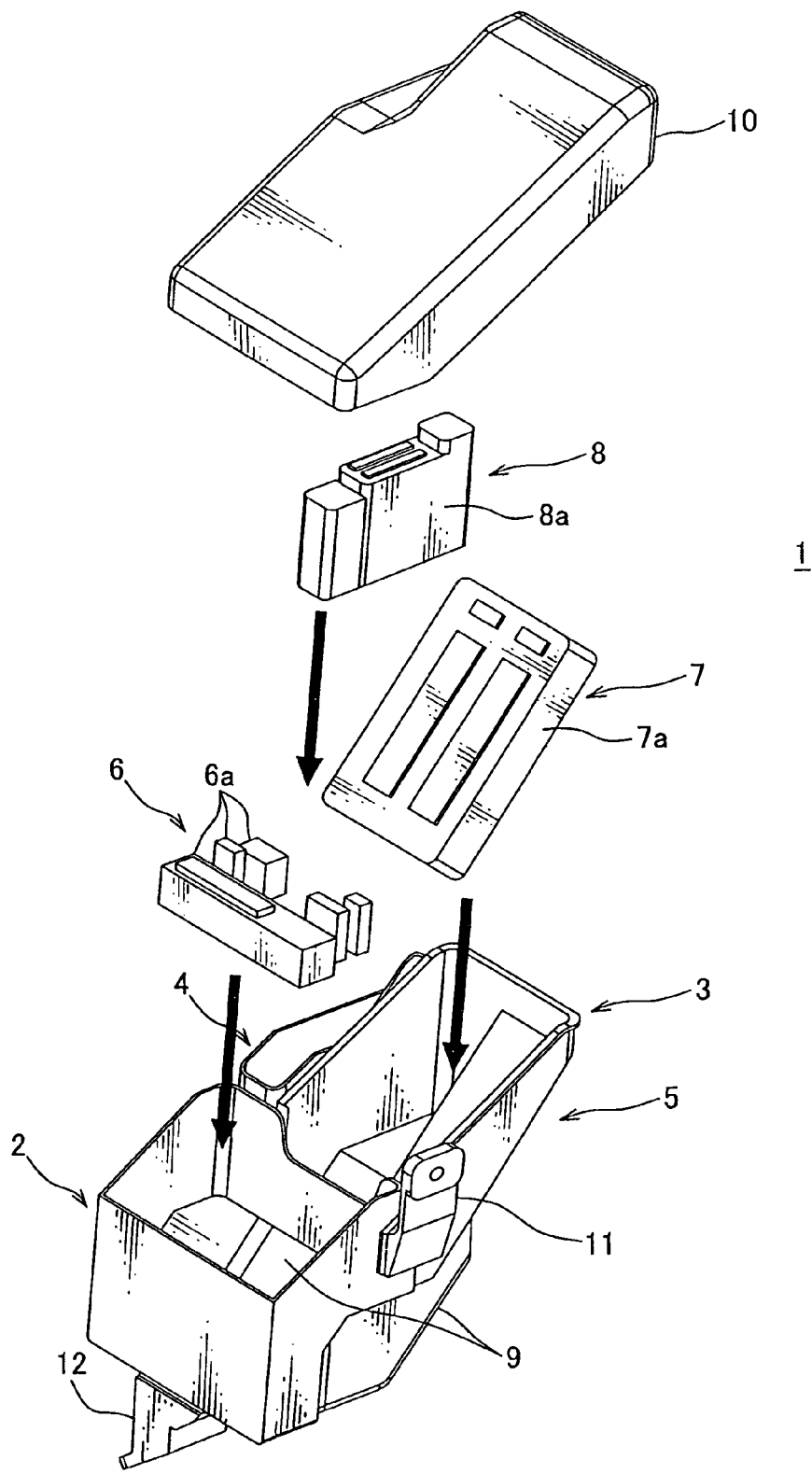
FIG. 1 is an exploded perspective view showing a partitioned electrical junction box according to the present invention.

As shown in FIG. 1, this partitioned electrical junction box 1 includes: a main cover 5 composed of three synthetic-resin-made partitioned junction box main bodies 2 to 4 joined each other; a connector block (first functional component) 6 received in a front-side first partitioned junction box main body 2; a substrate storage case (second functional component) 7 received in a rear-side second partitioned junction box main body 3; a fuse holder (third functional component) 8 received in a third partitioned junction box main body 4 positioned laterally from the second partitioned junction box main body 3; a synthetic-resin-made lower cover 9 fitted into the main cover 5 from below; a synthetic-resin-made upper cover 10 fitted into the main cover 5 from above; and fixing brackets 11, 12 arranged at required positions of the main cover 5.

The connector block 6 includes: a plurality of insulating resin-made connector housings 6a; and metallic terminals (not shown) received in the connector housings to connect wiring harnesses (not shown) to each other in the first partitioned junction box main body 2.

The substrate storage case 7 includes: an insulating resin-made case 7a; and circuit boards (not shown) such as a bus bar received in the case 7a, and has a junction block function and a control function, and is connected to a wiring harness (not shown) in the second partitioned junction box main body 3.

The fuse holder 8 is also referred to as fusible link holder, is composed of a box-shaped fusible link (not shown), a blade-type fuse, a relay and the like in an insulating resin-made holder main body 8a, has a battery distribution function, and is connected to a wiring harness (not shown) in the third partitioned junction box main body 4.

The partitioned electrical junction box 1 according to this embodiment is mounted on an engine room of a vehicle. A wiring harness (not shown) includes: a main wiring harness connected to a battery, in-vehicle electric components, and the like; and two sub wiring harness connected to electric components in a vehicle. The wiring harness is connected to the first to third functional components 6 to 8 from the lower cover 9 side, and the functional components 6 to 8 are connected to each other by the wiring harness.

Figure 7A:
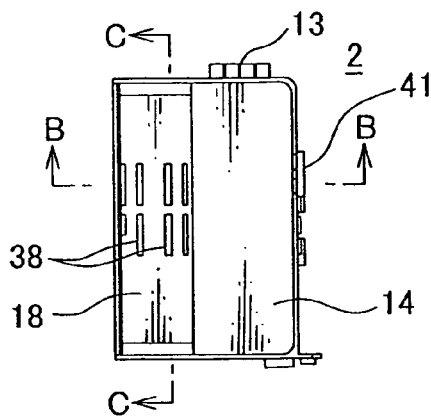
FIG. 7A is a plan view showing a first partitioned junction box main body of the main cover.

The partitioned junction box main bodies 2 to 4 appropriately include a lower opening 14 FIG. 7A), 15 (FIG. 9A) for inserting the wiring harness, notched front and rear opening 16, 17 (FIG. 2), and an upper opening for receiving the components. The functional components 6 to 8 are fixed without rattle to an inner wall or a partition wall (not shown) of the partitioned junction box main bodies 2 to 4 with locking members (not shown) such as concave and convex. At least a vertical partition wall (not shown) is provided on an inside of the first partitioned junction box main body 2 in XY direction.

By partitioning the main cover 5 into the partitioned junction box main bodies 2 to 4 corresponding to the functions of the functional components 6 to 8, it becomes easier to accept a derivative vehicle (a similar vehicle in the same group generated after a production of an original vehicle). Namely, in a case that only a connector block 6 of partitioned electrical junction boxes $1_2$, $1_3$ of the derivative vehicle is different from that of the partitioned electrical junction box 1 of the original vehicle, all you have to do is to change a shape and a size of the first partitioned junction box main body 2. Therefore, it is easy to change the design of the partitioned electrical junction box 1. Further, because the first partitioned junction box main body 2 is smaller than the main cover 5, a resin mold die to be changed is small and a production cost of the partitioned electrical junction box 1 is decreased. The same holds for changing the substrate storage case 7 and the fuse holder 8.

Figure 2:
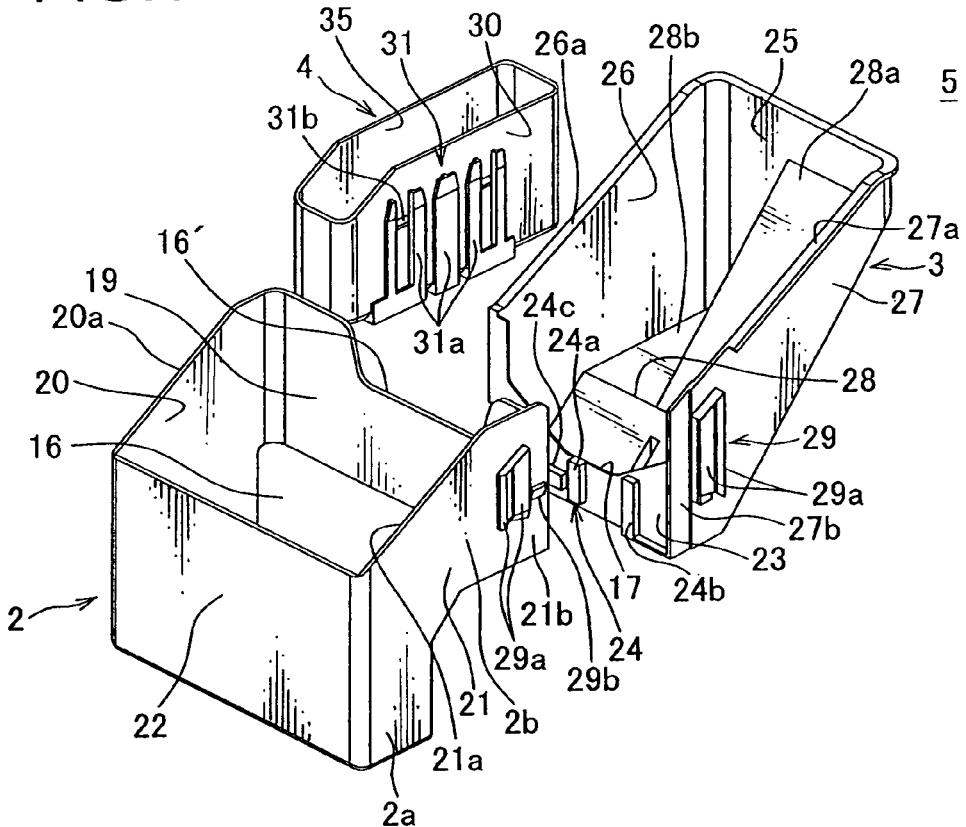
FIG. 2 is an exploded perspective view showing a partitioned main cover of the partitioned electrical junction box.
Figure 7B:
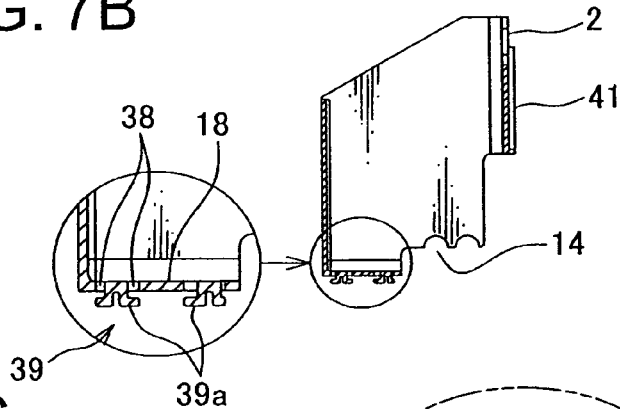
FIG. 7B is a sectional view taken on line B-B of FIG. 7A (an enlarged view is shown in a circle)
Figure 7C:
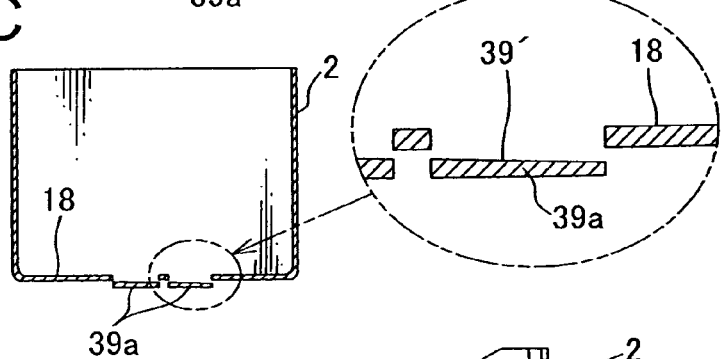
FIG. 7C is a sectional view taken on line C-C of FIG. 7A (an enlarged view is shown in a circle)

As shown in FIG. 2, the main cover 5 is partitioned into three partitioned junction box main bodies 2 to 4. A front side first partitioned junction box main body 2 is composed of a front vertically-long receiving part 2a and a rear horizontally-long receiving part 2b. The vertically-long receiving part 2a includes a horizontal bottom wall 18 (FIG. 7C). The horizontally-long receiving part 2b is formed in a frame shape with a vertical rear wall 19 and left and right wall 20, 21 and a front wall 22 of the vertically-long receiving part 2a, and includes a rear opening 16' and a lower opening 14 (FIG. 7A). Upper ends 20a, 21a of the left and right walls 20, 21 composing the frame-shaped wall are inclined front side down. Incidentally, in the description, directions of front rear left and right are for the sake of convenience, and do not necessarily correspond to an attaching direction of the partitioned electrical junction box 1 to a vehicle.

Figure 10A:
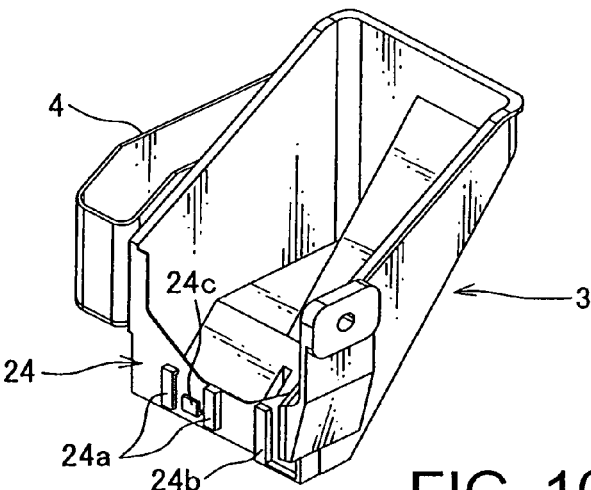
FIG. 10A is a perspective view showing a second and a third partitioned junction box main bodies.
Figure 10B:
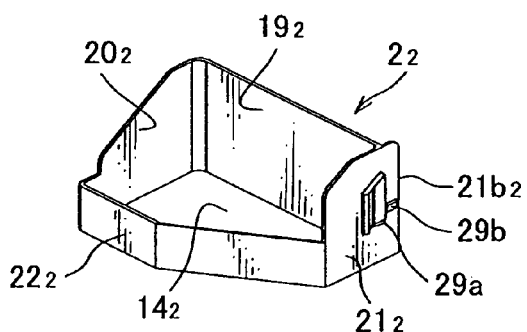
FIG. 10B is a perspective view showing another embodiment of a first partitioned junction box main body.
Figure 10C:
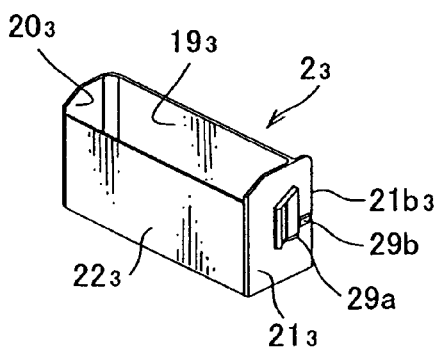
FIG. 10C is a perspective view showing another embodiment of the first partitioned junction box main body.
Figure 10D:
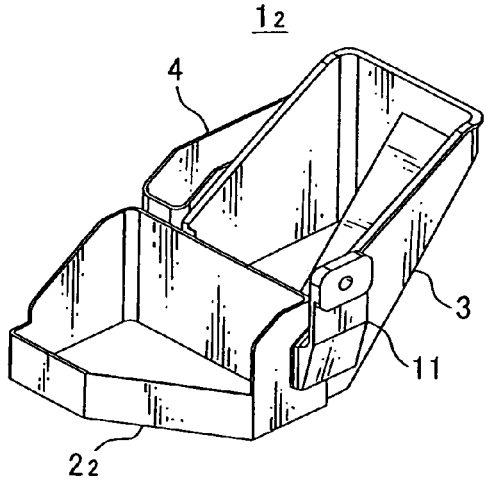
FIG. 10D is a perspective view showing a main cover composed of a combination of partitioned junction box main bodies shown in FIGS. 7A and 7B.
Figure 10E:
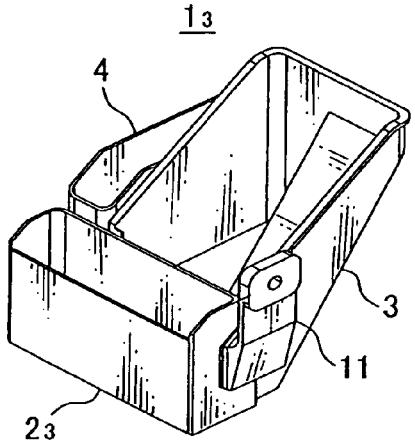
FIG. 10E is a perspective view showing a main cover composed of a combination of partitioned junction box main bodies shown in FIGS. 7A and 7C.
Figure 10F:
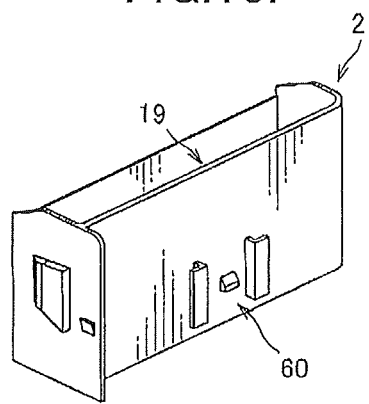
FIG. 10F is a perspective view showing the first partitioned junction box main body.

In FIG. 10F, a joining part 60 to the rear side second partitioned junction box main body 3 is provided at an outer surface of the rear wall 19 of the first partitioned junction box main body 2. As shown in FIG. 10A, a joining part 24 provided at an outer surface of a front wall 23 of the second partitioned junction box main body 2 is composed of a pair of symmetrical vertical rails 24a each having an L-shaped cross section, the other rail 24b, and a projection 24c interposed between the rails 24a, 24b. Each of rails 24a, 24b has a stopper wall at an upper end thereof. A vertical guiding groove (not shown) is formed on an inside of each rail 24a, 24b.

The joining part 60 of the rear wall 19 of the first partitioned junction box main body 2 is composed of, for example, a pair of symmetrical vertical rails having an L-shaped cross section for slidingly engaging with the rails (inside guiding grooves) 24a, 24b upward from a bottom side, and a projection (having an upper inclined wall and a lower substantially horizontal locking wall) for moving over and engaging with the projection (having a lower inclined wall and an upper locking wall) 24c.

The second partitioned junction box main body 3 includes: vertical front, rear, left, and right walls 23, 25, 26, 27; and a bottom wall 28. Upper ends 26a, 27a of the left and right walls 26, 27 are inclined front side down. The bottom wall is composed of a right-half inclined part 28a and a left-half horizontal part 28b.

The right wall 21 of the first partitioned junction box main body 2 is extended backward. The right wall 27 of the second partitioned junction box main body 3 is extended forward. An extending wall 21b of the first partitioned junction box main body 2 is overlapped (joined) with an outside of a lower extending wall 27b of the second partitioned junction box main body 3 and both right walls 21, 27 are arranged in the same plane. Vertical rails 29a having guiding grooves, for example, having a T-shaped section are provided at both right walls 21, 27 as a first bracket fitting part 29. The rail 29a includes a stopper wall at an upper end thereof. A locking projection 29b is provided at the extending wall 21b of the first partitioned junction box main body 2. The projecting 29b includes an inclined wall at a lower side and a substantially horizontal locking wall at an upper side thereof.

The third partitioned junction box main body 4 is formed in a rectangular frame shape, and includes front, rear, left, and right walls. A plurality of vertical rails 31a having a T-shaped section is provided on an outer surface of a long side right wall 30 as a joining part 31. The rail 31a includes a guiding groove in an inside thereof, and a stopper wall at a lower end thereof. A locking projection 31b is provided between the rails 31a. The projection 31b includes an upper inclined wall and a lower substantially horizontal locking wall.

Figure 10G:
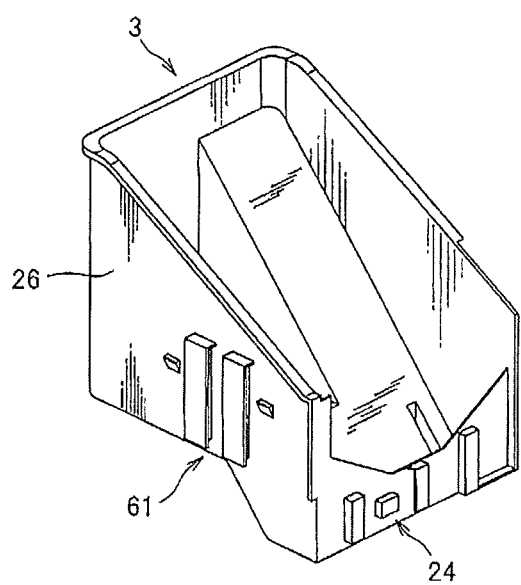
FIG. 10G is a perspective view showing the second partitioned junction box main body.

In FIG. 10G, a vertical rail having a T-shaped section and a projection as a joining part 61 corresponding to the joining part 31 of the third partitioned junction box main body 4 is provided on an outer surface of a right wall 26 of the second partitioned junction box main body 3. The rail includes a stopper wall at an upper end thereof. The projection includes a lower inclined wall and an upper substantially horizontal locking wall.

The first and third partitioned junction box main bodies 2, 4 are slidingly connected upward from below to the second partitioned junction box main body 3 (the second partitioned junction box main body 3 is slidingly connected downward from above to the first and third partitioned junction box main bodies 2, 4) to form the main cover 5 shown in FIG. 3. Incidentally, the number or a shape of the rails, the guiding grooves, the projections as the joining part can be changed as necessary.

Figure 3:
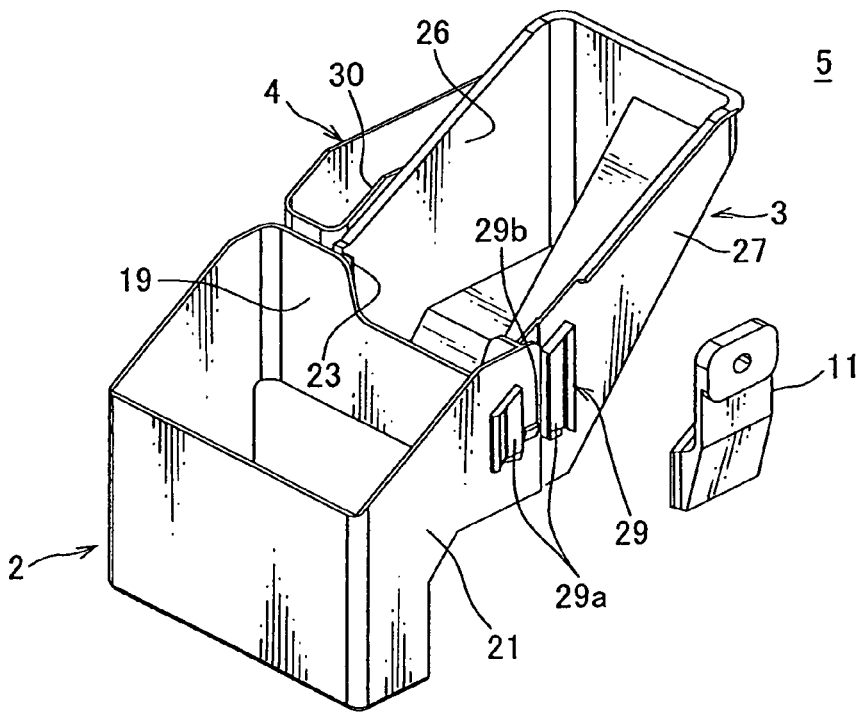
FIG. 3 is a perspective view showing assembled partitioned main cover.

As shown in FIG. 3, the rails 29a of the right walls 21, 27 of the first and second partitioned junction box main bodies 2, 3 are parallel to each other, back and forth. The rear wall 19 of the first partitioned junction box main body 2 and the front wall 23 of the second partitioned junction box main body 3 are overlapped with (come close to) each other in a thickness direction to form a double wall. The left wall 26 of the second partitioned junction box main body 3 and the right wall 30 of the third partitioned junction box main body 4 are overlapped with (come close to) each other in a thickness direction to form a double wall. These double walls increases rigidity (strength) of the main cover 5. The first bracket 11 made of synthetic resin and having a separated body is fitted and fixed to the fitting part 29 of the right walls 21, 27. A width in a left-and-right direction of the first partitioned junction box main body 2 is equal to a width in a left-and-right direction of the second and third partitioned junction box main bodies 3, 4 connected to each other.

Figure 4:
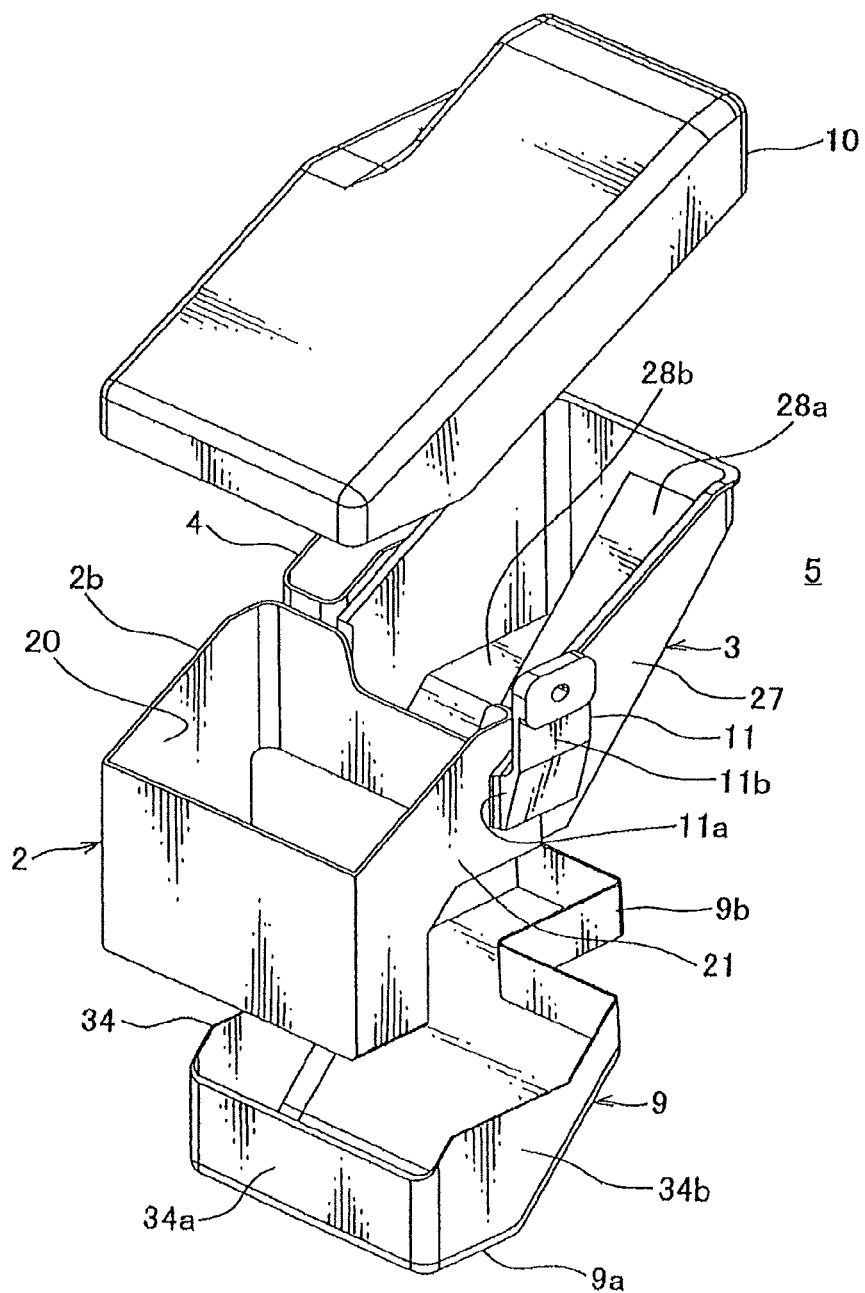
FIG. 4 is an exploded perspective view showing an intermediate main cover and upper and lower covers.

As shown in FIGS. 4 and 5A, the bracket 11 is slidingly fitted from below into the rails 29a of both right walls 21, 27 (FIG. 3) as a joining part of the first and second partitioned junction box main bodies 2, 3, so that joint strength of the first and second partitioned junction box main bodies 2, 3 is increased.

The bracket 11 is composed of a lower-half thick fitting part 11a and an upper-half vertical plate part 11b. The plate part 11b is separated outside from the right walls 21, 27 of the partitioned junction box main bodies 2, 3 and forms a gap 11c between the right walls 21, 27 and the plate part 11b for inserting the upper cover 10. The plate part 11b includes a bolt inserting hole 11e for fixing at the vehicle body side.

As shown in FIG. 5B, the fitting part 11a of the bracket 11 includes: rails 11b having a T-shaped section for engaging with the guiding grooves in the rails 29a of the right walls 21, 27; and a projection for moving over and engaging with the projection 29b (FIG. 3) of the right wall 21 from below. The projection includes an upper inclined wall and a lower substantially horizontal locking wall.

As shown in FIG. 5A, a second bracket 12 made of synthetic resin and having a separated body is slidingly fitted into a horizontal bottom wall 18 (FIG. 7) of the first partitioned junction box main body 2. The second bracket 12 is composed of an upper-half vertical plate part 12a and a lower-half inclined part 12b. A bolt inserting hole 12c is provided on the inclined part 12b. In FIG. 5A, the reference number 32 indicates a notch for guiding out an electric wire provided at a lower end of the right wall 20 of the first partitioned junction box main body 2. The notch 32 is fitted together with a notch of the lower cover 9 (not shown) to form a circular electric wire guiding hole. The reference number 33 indicates a later-described connector holding part.

As shown in FIG. 4, the lower cover 9 is composed of a front-half rectangular wide part 9a and a rear-half rectangular narrow part 9b. As shown in a chain line of FIG. 9B, the wide part 9a is positioned corresponding to the rear half 2b (FIG. 4) of the first partitioned junction box main body 2 and the front half (a front half of a horizontal part 28c and an inclined part 28d of the bottom wall 28 in FIG. 9) of the second partitioned junction box main body 3. The narrow part 9b is positioned corresponding to a left half of the horizontal part 28b of the second partitioned junction box main body 3 and the third partitioned junction box main body 4.

From a state shown in FIG. 4 (in reality, from a state that components 6 to 8 are received in the partitioned junction box main bodies 2 to 4, and an outer wiring harness is connected to the components 6 to 8), the lower cover 9 is attached to the bottom of the main cover 5, and then, the upper cover 10 is attached to the top of the main cover 5.

Figure 9A:
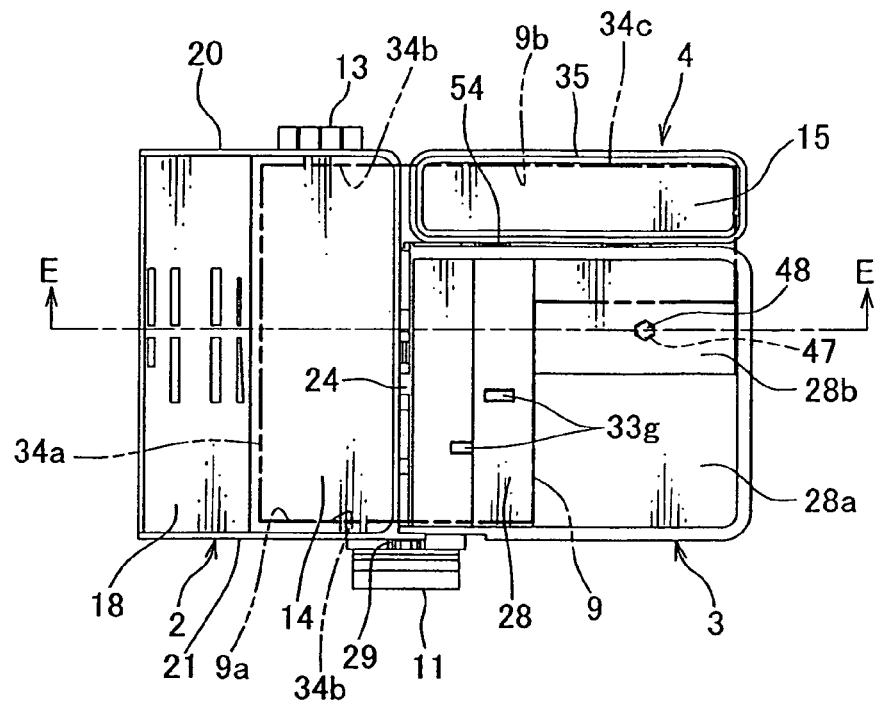
FIG. 9A is a plan view showing a fitting structure between the assembled main cover and a vehicle body.
Figure 9B:
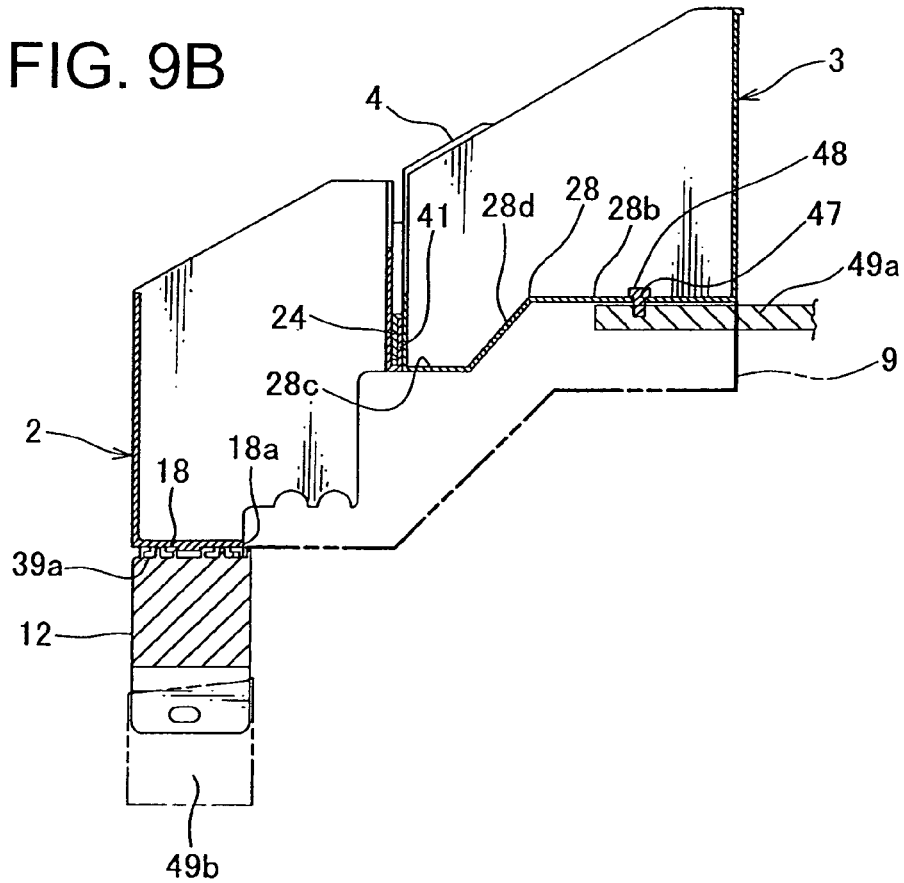
FIG. 9B is a sectional view taken on line E-E of FIG. 9A.

As shown in FIGS. 6, 9A, and 9B, the lower cover 9 is fitted into a not-shown concave groove of the main cover 5, and the upper cover 10 is fitted into an outside of the main cover 5. The concave groove is formed between the double wall (not shown) disposed inside and outside of the main cover 5 at the lower side thereof. An inner wall at an outside of the concave groove and an inner wall at an inside of the concave groove face each other. While the outer wall at the upper end of the lower cover 9 abuts on the inner wall at the outside of the concave groove, the lower cover 9 is locked with a locking piece (not shown) on the outer wall of the double wall. For example, the upper end of the vertical front wall 34a of the wide part 9a of the lower cover 9 is fitted into the concave groove at the rear end 18a of the bottom wall 18 (FIG. 9B) of the front-half of the first partitioned junction box main body 2. The upper ends of the front half of the vertical left and right walls 34b of the wide part 9a are fitted into the concave grooves at the bottom ends of the left and right walls 20, 21 of the first partitioned junction box main body 2. The upper ends at the rear half of the left and right walls 34 are fitted into the concave groove of the bottom wall 28 at the front half of the second partitioned junction box main body 3. The upper end of the vertical wall 34c (FIG. 9A) of the narrow part 9b (FIG. 4) is fitted into the concave groove at the lower end of the vertical wall 35 (FIG. 2) of the third partitioned junction box main body 4.

As the lower cover 9 abuts on the inner wall at the outside of the concave groove at the bottom of the main cover 5, the lower cover 9 is fitted into the main cover 5, and the lower inner wall of the upper cover 10 is fitted into the upper outer wall of the main cover 5 from outside. Therefore, the main cover 5 is held from inside and outside by the covers 9, 10, and the partitioned junction box main bodies 2 to 4 are firmly fixed without wavering. Even if there is an assembling dimension error between the partitioned junction box main bodies 2 to 4, the upper and lower covers 9, 10 tighten the partitioned junction box main bodies 2 to 4 from inside and outside to fix them firmly without wavering.

The lower cover 9 and the partitioned junction box main bodies 2 to 4 as the main cover 5 are respectively locked by locking members (not shown). Preferably, the upper cover 10 and the partitioned junction box main bodies 2 to 4 are also respectively locked with the locking members (not shown) for increasing the joint strength of the partitioned junction box main bodies 2 to 4. However, this becomes difficult to open/close the upper cover 10 in a case of maintenance or the like, for example, the upper cover 10 may be locked with only the first and second partitioned junction box main bodies 2, 3.

As an example of a locking member, there is a claw provided on the vertical wall 34 of the lower cover 9 for engaging with a concave formed on the bottom of the partitioned junction box main bodies 2 to 4, or a locking arm extending downward from the vertical wall 37 of the upper cover 10 for engaging with a projection formed on the top of the partitioned junction box main bodies 2 to 4.

At first the lower cover 9 is fitted into the main cover 5, and then the upper cover 10 is fitted into the main cover 5. For example, when the lower cover 9 is fitted into the main cover 5, if any of the partitioned junction box main bodies 2 to 4 is not fully jointed, the lower cover 9 cannot be fitted into the main cover 5 (the lower cover 9 cannot be locked with the main cover 5), so that an assembling operator can notice an assembling failure. Even if the operator cannot notice when the lower cover 9 is assembled, the operator can notice a trouble because the upper cover 10 cannot be fitted into the main cover 5 when the upper cover 10 is assembled.

As shown in FIGS. 7A to 7D, a pair of rails 39a back and forth having a T-shaped vertical section as the second bracket 39 are formed on an outer surface of the horizontal bottom wall 18 of the first partitioned junction box main body 2.

Figure 7D:
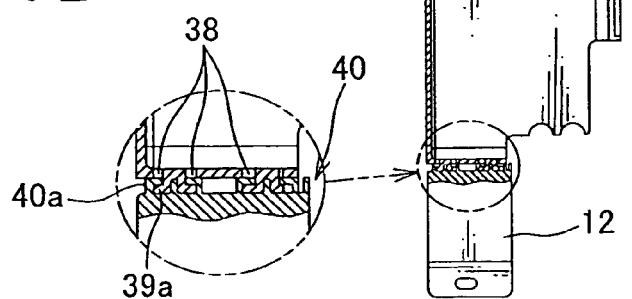
FIG. 7D is a sectional view showing a fitting state of a second bracket corresponding to the sectional view taken on line B-B.

Because the first partitioned junction box main body 2 is made with upper and lower synthetic resin molds, and simultaneously rails 39a are formed, die holes 38 for the rails 39a are formed on the bottom wall 18. However, as shown in FIG. 7D, when the bracket 12 is horizontally slidingly fitted, the die holes 38 are sealed, and a basic waterproof is performed. Rails 40a having an L-shaped vertical section as fitting parts 40 for engaging with the rails 39a on the bottom wall 18 are formed on a horizontal upper end surface of the bracket 12, and a guiding groove is formed at an inside of the rail 40a. Each of fitting parts 39, 40 has a locking projection (not shown) for moving over and engaging each other.

As shown in FIG. 7C, when the rail 39a of the bottom wall 18 is formed in a taper shape, namely, when an upper surface of the rail 39a relative to a lower surface of the bottom wall 18 is inclined in a taper shape as a inclined wall 39a', and a lower surface of the rail 39a is parallel to the lower surface of the bottom wall 18, a tapered gap is formed between the rail 40 (having no inclined surface) and the rail 39a of the bottom wall 39a. Therefore, a water drop in the first partitioned junction box main body 2 can be extracted outside along the tapered gap due to its own weight. In FIG. 7B, reference number 41 indicates a rail as a joining part 41 for slidingly engaging with a joining part 24 (FIG. 2) of the second partitioned junction box main body 3.

Figure 8A:
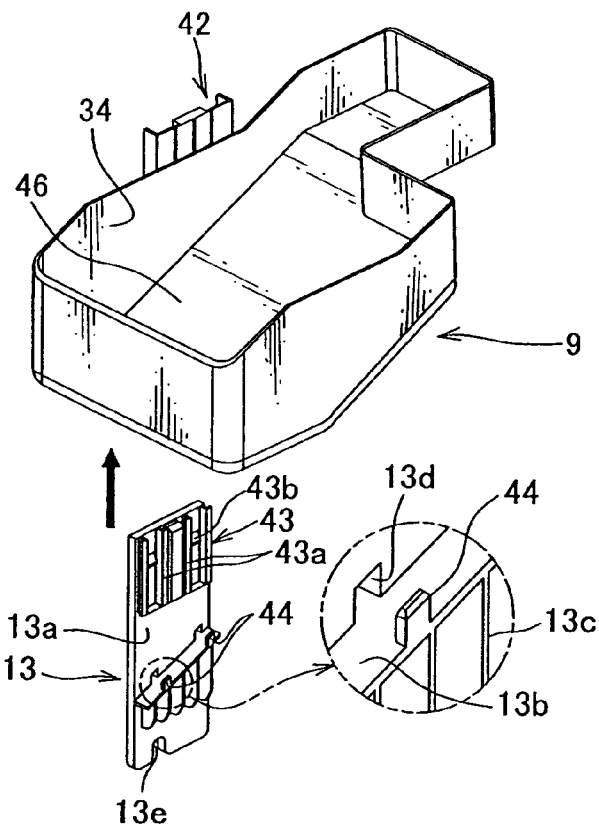
FIG. 8A is an exploded perspective view showing a fitting structure between a lower cover and a third bracket.
Figure 8B:
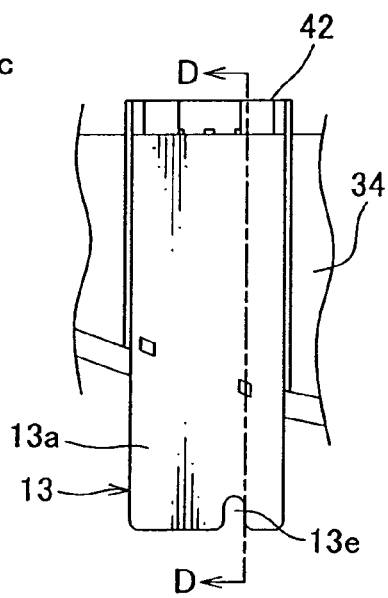
FIG. 8B is a side view showing the fitting structure between the lower cover and the third bracket.
Figure 8C:
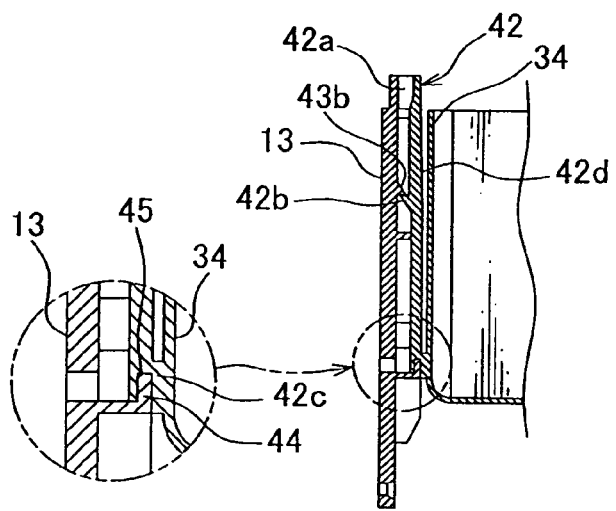
FIG. 8C is a sectional view taken on line D-D of FIG. 8B.

As shown in FIGS. 8A to 8C, a vertical long third fitting part 42 into which a third bracket 13 made of synthetic resin and having a separated body is vertically slidingly fitted is formed on the vertical left wall (side wall) 34 of the lower cover 9. When the rail 43a having a horizontally L-shaped or T-shaped section of the fitting part 43 at the upper-half of the third bracket 13 is slidingly into the fitting part 42, and simultaneously, a vertical plate-shaped claw (convex) 44 at the lower half of the bracket 13 is inserted into and engaged with a hole (concave) 45 at the lower end of the fitting part 42, attaching strength of the bracket 13 is increased, and the lower half of the bracket 13 is prevented from opening outside.

As shown in FIG. 8C, the fitting part 42 is composed of a support part 42c horizontally briefly projected from the bottom of the left wall 34, a plate part 42d extending vertically from the support part 42c, a plurality of rails 42a having a horizontally L-shaped or T-shaped section formed on an outer surface of the plate part 42d, and a projection 42b interposed between the rails 42a. The projection 42b includes a lower inclined wall and an upper substantially horizontal locking wall. An upward hole 45 for engaging with the claw 44 is formed at the lower end of the plate part 42d. The claw 44 is projected in a slidingly fitting direction of the bracket 13, and the hole 45 is bored in the same direction.

As shown in FIG. 8A, the third bracket 13 includes: a rail 43a having an L-shaped or T-shaped horizontal section provided on an upper-half inner surface of the vertically-long rectangular-shaped plate part 13a; and a projection 43b interposed between the rails 43a. The projection 43b includes: an upper inclined wall; and a lower substantially horizontal locking wall. A horizontal rib 13b inclined corresponding to an inclination of the bottom wall 46 of the lower cover 9 is provided on a lower-half inner surface of the plate part 13a. The horizontal rib 13b is reinforced by a plurality of vertical ribs 13c. Two claws having a rectangular plate shape are provided back and forth at a tip end of the horizontal rib 13b. The reference number 13b indicates a die hole for resin molding the claw 44.

As shown in FIG. 8B, a notch hole 13e for inserting a bolt is formed on the bottom end of the plate part 13a. As shown in FIG. 8A, the bracket 13 is slidingly fitted into the fitting part 42 upward from below, and simultaneously, as shown in FIG. 8C, the claw 44 of the bracket 13 is engaged with the concave 45 at the bottom end of the fitting part 44, and then, a bolt (not shown) is horizontally inserted into the notch hole 13e of FIG. 8B, so that the bracket 13 is fixed to a vehicle body or the like.

An engagement between the claw 44 and the hole 45 is useful for forming the notch hole 13 at the lower end of the vertically long bracket 13. Incidentally, it is also possible that the claw 44 is projected downward from the lower end of the right wall 34, and the hole 45 is formed on the horizontal rib 13b of the bracket 13. The hole 45 may be replaced with a groove, and the claw 44 may be replaced with a projection or a rib.

As shown in FIGS. 9A and 9B, a hole 47 for inserting a bolt is formed on the horizontal part 28b of the bottom wall 28 of the second partitioned junction box main body 3. While the upper cover 10 is put off, a rim of the hole 47 is tightened and fixed to a horizontal fixed part 49a of a vehicle body with a bolt 48.

Further, the second bracket 12 fitted into the rail 39a at the horizontal bottom wall 18 of the first partitioned junction box main body 2 is tightened and fixed to an inclined fixed part 49b of a vehicle body which is lower than the fixed part 49a with a bolt (not shown). The vertical first bracket 11 engaged with the fitting part 29 of the first and second partitioned junction box main bodies 2, 3 is tightened and fixed to a vehicle body or other fixed structure (not shown) with a horizontal bolt (not shown). The vertical third bracket 13 of the lower cover (shown by a chain line 9 in FIG. 9B) is tightened and fixed to a vehicle body or other fixed structure (not shown) with a horizontal bolt (not shown).

As shown in FIG. 9B, the first partitioned junction box main body 2 is positioned lower than the second partitioned junction box main body 3. The joining part 24 of the second partitioned junction box main body 3 is slidingly fitted downward from above into the joining part 41 of the first partitioned junction box main body 2, so that the second partitioned junction box main body 3 pushes downward the first partitioned junction box main body 2 toward the fixed part 49$b$ of a vehicle body. Similarly, the joining part 54 of the second partitioned junction box main body 3 pushes downward the joining part 31 (FIG. 2) of the third partitioned junction box main body 4 toward the fixed part 49$a$ of a vehicle body.

In this state, because the bottom wall 28$b$ of the second partitioned junction box main body 3 is pushed downward and fixed to the fixed part 49$a$ (having a nut) with a downward bolt 48, namely, because a pushing direction of the first and third partitioned junction box main bodies 2, 4 by the second partitioned junction box main body 3 is equal to a threading direction of the bolt 48, the first to third partitioned junction box main bodies 2 to 4 are firmly fixed to a vehicle body without wavering. In FIG. 9A, reference number 33$g$ indicates a die hole for later-described connector holding part 33.

FIGS. 10A to 10E show an embodiment in which several types of shapes of the first partitioned junction box main body 2 of the main cover 5 are provided corresponding to derivative vehicles or the like (the first partitioned junction box main bodies $2_2$, $2_3$ of FIGS. 10B, 10C are provided other than the first partitioned junction box main body 2 of FIG. 2), and the second and third partitioned junction box main bodies 3, 4 (FIG. 10A) are commonly used as described above.

This embodiment corresponds to a case that a type (size, shape, or number) of the connector block 6 (FIG. 1) is changed corresponding to the derivative car or the like. If a type of the substrate storage case 7 (FIG. 1) is changed, a size or a shape of the second partitioned junction box main body 2 is changed. If a type of the fuse holder 8 is changed, a shape or a size of the third partitioned junction box main body 4 is changed.

The first partitioned junction box main body $2_2$ shown in FIG. 10B includes front, rear, left and right walls 19$2$ to 22$2$ in a shallow frame shape and in a substantially trapezoid shape in a plan view, having no bottom wall and having upper and lower openings (the lower opening is indicated by reference number 14$_2$). A rail 29$a$ and a projection 29$b$ are provided on a right wall 21$_2$ and its extending wall 21$b_2$. The fitting part 29 corresponding to the bracket 11 (FIG. 10D) is composed of these rail 29$a$ and projection 29$b$ and a rail 29$a$ (FIG. 2) of the second partitioned junction box main body 3. A joining part (not shown) corresponding to the joining part 24 of the second partitioned junction box main body 3 is provided on the rear wall 19$_2$. A main cover 1$_2$ shown in FIG. 10D is composed of a combination of the second and third partitioned junction box main bodies 3, 4 shown in FIG. 10A and the first partitioned junction box main body 2$_2$ shown in FIG. 10B.

The first partitioned junction box main body 2$_3$ shown in FIG. 10C includes front, rear, left, and right walls 19$_3$ to 22$_3$ in a frame shape and in a rectangular shape in a plan view having no bottom wall and having upper and lower openings and formed narrow in a longitudinal direction. Configurations of a right wall 21$_3$, its extending wall 21$b_3$, a rail 29$a$, and a projection 29$b$ are the same as the previous embodiment. A main cover 13 is composed of a combination of the second and third partitioned junction box main bodies 3, 4 shown in FIG. 10A, and the first partitioned junction box main body 2$_3$ shown in FIG. 10C.

Conventionally, it is well known that the blocks or the like are changed in a synthetic-resin-made box (frame or main cover). However, as shown in FIG. 10A to 10D, the main cover 5 itself is changed to variable shapes to eliminate a useless space in the main cover 5, so that the main cover 5, namely, the partitioned electrical junction box 1 can be compact.

Figure 11A:
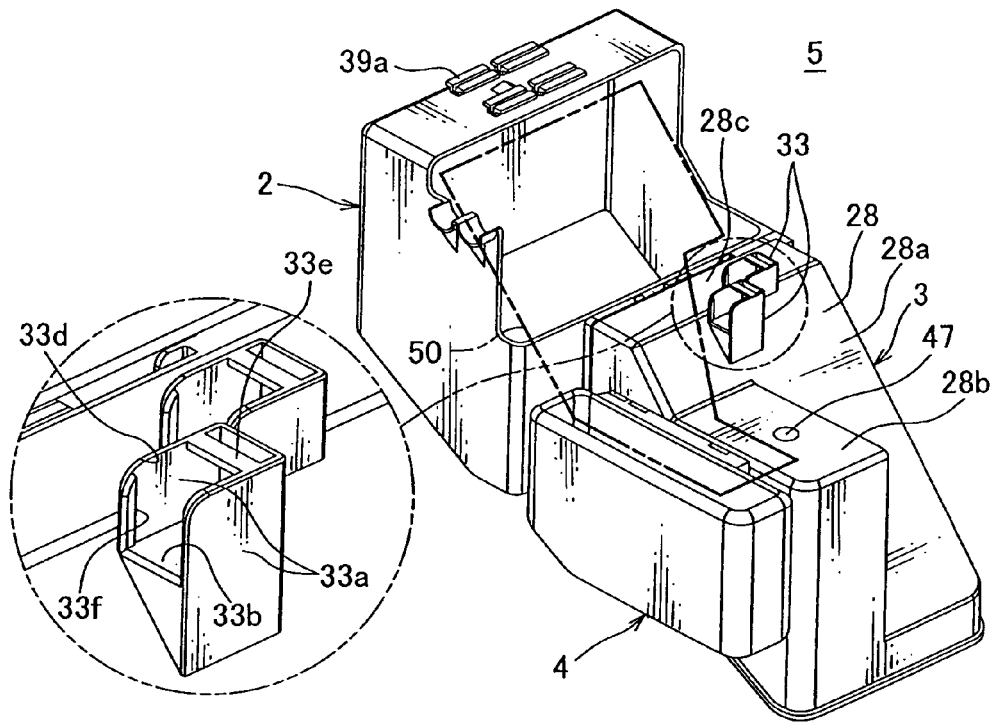
FIG. 11A is a perspective view showing a rear side of the main cover (enlarged view is shown in a circle)
Figure 11B:
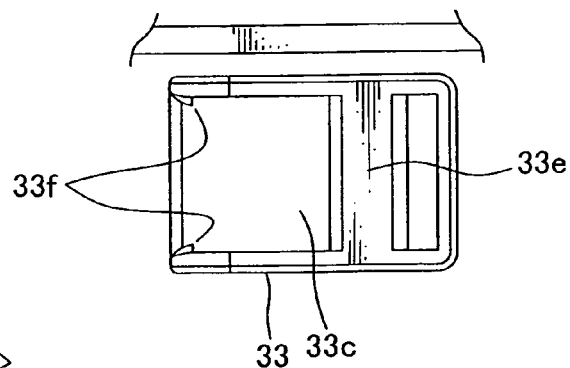
FIG. 11B is a plan view showing a connector holding part.
Figure 11C:
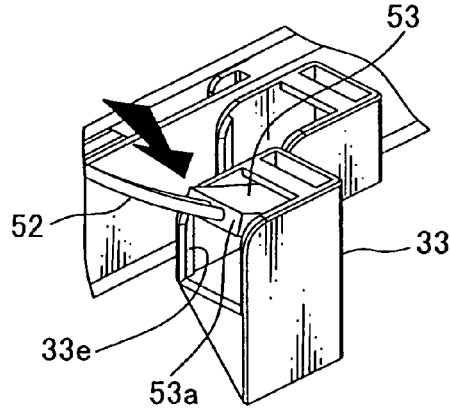
FIG. 11C is a perspective view showing a connector holding condition.
Figure 12:
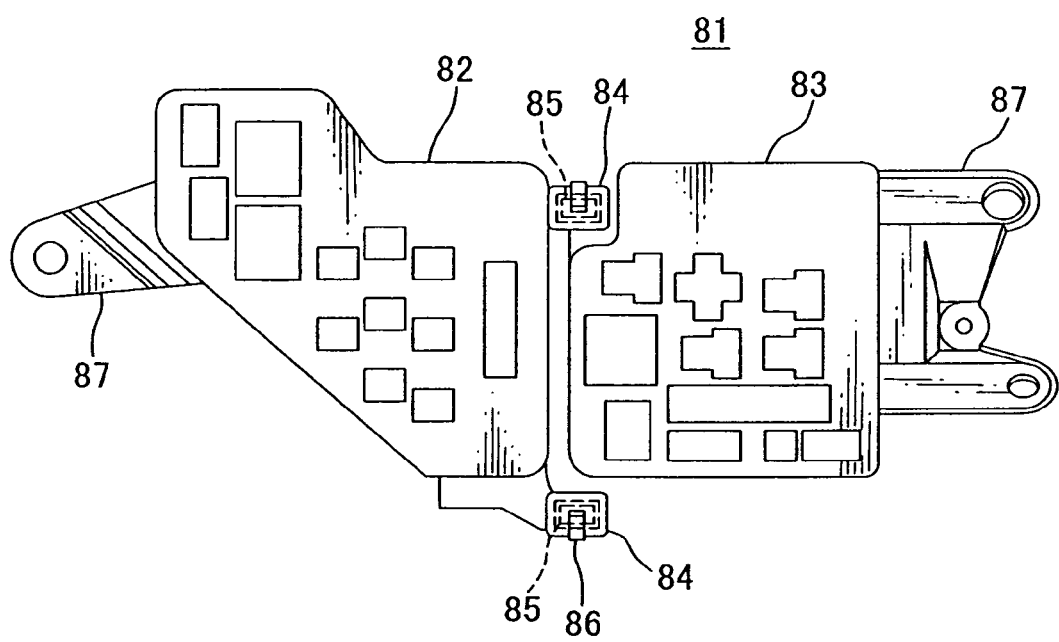
FIG. 12 is a plan view showing a conventional partitioned electrical junction box.

FIGS. 11A to 11C show an embodiment in which the connector holding part 33 is arranged on the bottom wall 28 of the second partitioned junction box main body 3 using a dead space at a rear side of the main cover 5, namely, a dead space between the main cover 5 and the lower cover 9.

The main cover 5 shown in FIG. 11A is flip vertical of the main cover 5 shown in FIG. 4, and composed of the first partitioned junction box main body 2, the second partitioned junction box main body 3, and the third partitioned junction box main body 4. The second partitioned junction box main body 3 includes the bottom wall 28. In this embodiment, two connector holding parts 33 are arranged adjacently on the inclined part 28$a$ and the horizontal part 28$c$. The connector holding parts 33 are arranged other than a layout space 50 for a wiring harness and components.

As shown in FIGS. 11A and 11B, the connector holding part 33 is composed of vertical walls 33$a$ disposed at three sides of front, rear, and right, a horizontal wall 33$b$ at a bottom side, a connector receiving space 33$c$ surrounded by the walls 33$a$, 33$b$, an opening 33$d$ communicating with an upper side and a right side, and a stopper wall 33$e$ formed by connecting the front and rear walls 33$a$ and partially covering the opening 33$d$, and a pair of vertically-long claws 33$f$ provided at both inner edges of the front and rear walls 33$a$.

As shown in FIG. 11C, a joint connector 53 having an electric wire 52 of a wiring harness is inserted obliquely downward into the receiving space 33$c$ by an operator as shown with an arrow. In this embodiment, two connectors 23 are received in the receiving space 33$c$ in a manner that the connectors 23 are overlapped each other in upper and lower steps. Then, the claw 33$f$ locks a shoulder 53$a$ at rear end of the connector 53. Thereby, when attaching the lower cover 9, the electric wire 52 connected to the connector 53 is prevented from being caught between the main cover 5 and the lower cover 9.

The connector holding part 33 eliminates a process in which the connector 53 is fixed to the wiring harness with a tape or the like. When routing electric wire in the partitioned electrical junction box 1, the connector 53 does not interrupt the routing. Further, after the lower cover 9 is attached, the connector 53 is prevented from wavering.

Incidentally, in this embodiment, the third partitioned junction box main body 4 is joined with the second partitioned junction box main body 3. However, it is possible that the joining parts are so arranged that the third partitioned junction box main body 4 is joined with the first and second partitioned junction box main bodies 2, 3 at the same time. Each joining part is composed of a rail for sliding and a projection for locking. The projection may be a rib. A shape of the joining part is changeable as necessary.

Further, in this embodiment, three partitioned junction box main bodies 2 to 4 are joined together. However, more than three, for example, four partitioned junction box main bodies (not shown) can be joined together. In this case also, the partitioned junction box main bodies are joined together with the joining parts composed of rails and projections, and firmly fixed without wavering with the upper and lower covers 9, 10 and the bracket 11.

Further, in this embodiment, the first and second partitioned junction box main bodies 2, 3 are joined together with the bracket 11. Similarly, the second and third partitioned junction box main bodies 3, 4 may be joined together with the bracket, or the first and third partitioned junction box main bodies 2, 4 may be joined together with the bracket.

Further, in this embodiment, as shown in FIG. 8A, the bracket 13 having the claw 44 and the fitting part 42 are provided on the lower cover 9. However, the bracket 13 having the claw 44 and the fitting part 42 may be provided on the main cover 5 (any of the first to third partitioned junction box main bodies 2 to 4) other than the lower cover 9.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A partitioned electrical junction box comprising:
   a main cover including at least three partitioned junction box main bodies each having one or more joining parts attached to an outer surface of each of the three partitioned junction box main bodies, wherein each of the three partitioned junction box main bodies are slidably connected to at least one of the three partitioned junction box main bodies by sliding one or more projections and rails of the joining part of each of the three partitioned junction box main bodies into corresponding rails of the other joining part attached to one of the outer surfaces of one of the three partitioned junction box main bodies, each of the three partitioned junction box main bodies partitioning a first functional component from at least two other functional components;
   a lower cover configured to fit into an inner perimeter of the main cover formed from the at least three main bodies; and
   an upper cover configured to fit on top of the main cover formed from the at least three main bodies to enclose the main cover and the one or more functional components therein.

2. The partitioned electrical junction box as claimed in claim 1,
   wherein the lower cover is fitted into a recess groove of the main cover, and the upper cover is fitted along an outer surface of the main cover.

3. The partitioned electrical junction box as claimed in claim 1,
   wherein different functional components are received respectively in the three partitioned junction box main bodies.

4. The partitioned electrical junction box as claimed in claim 1,
   wherein first fitting parts are adjacently provided on any two of the partitioned junction box main bodies, and a first bracket is slidingly fitted into the first fitting parts so as to join the two partitioned junction box main bodies.

5. The partitioned electrical junction box as claimed in claim 1,
   wherein a second fitting part is provided on a bottom wall of any one of the partitioned junction box main bodies, and a second bracket is slidingly fitted into the second fitting part so as to seal a die hole for forming the second fitting part on the bottom wall.

6. The partitioned electrical junction box as claimed in claim 5,
   wherein an inclined surface is provided on a rail as the second fitting part, and water in any of the partitioned junction box main bodies is discharged along the inclined surface.

7. The partitioned electrical junction box as claimed in claim 1,
   wherein a third fitting part is provided on a side wall of the lower cover or the main cover, and
   wherein simultaneously, a fitting part at one side of a third bracket is slidingly fitted to one side of the third fitting part, and a convex or a concave at the other side of the third bracket is slidingly engaged with a concave or a convex at the other side of the third fitting part.

8. The partitioned electrical junction box as claimed in claim 1,
   wherein a connector holding part is provided on a dead space between a bottom side of any one of the partitioned junction box main bodies and the lower cover, and a joint connector is temporarily fixed to the connector holding part.

9. The partitioned electrical junction box as claimed in claim 1,
   wherein the joining part of any one of the partitioned junction box main bodies is slidingly joined together from above with the joining parts of the other two partitioned junction box main bodies, and the one of the partitioned junction box main bodies is fixed from above to a mounting-side structure with a screw.

* * * * *